United States Patent
Parkkinen et al.

(10) Patent No.: US 8,787,899 B2
(45) Date of Patent: Jul. 22, 2014

(54) RESTRICTING AND PREVENTING PAIRING ATTEMPTS FROM VIRUS ATTACK AND MALICIOUS SOFTWARE

(75) Inventors: Jukka Parkkinen, Oulu (FI); Mikko A Hyvarinen, Oulu (FI)

(73) Assignee: Nokia Corporation, Espoo (FI)

( * ) Notice: Subject to any disclaimer, the term of this patent is extended or adjusted under 35 U.S.C. 154(b) by 1712 days.

(21) Appl. No.: 11/477,462

(22) Filed: Jun. 30, 2006

(65) Prior Publication Data
US 2008/0003997 A1    Jan. 3, 2008

(51) Int. Cl.
- *H04M 11/00* (2006.01)
- *H04L 29/06* (2006.01)
- *H04W 12/12* (2009.01)
- *H04W 76/04* (2009.01)
- *H04W 12/08* (2009.01)
- *H04W 76/06* (2009.01)

(52) U.S. Cl.
CPC .............. *H04W 12/12* (2013.01); *H04L 63/145* (2013.01); *H04W 76/04* (2013.01); *H04W 12/08* (2013.01); *H04W 76/06* (2013.01)
USPC .......... 455/421; 455/410; 455/411; 455/41.2; 370/383

(58) Field of Classification Search
USPC ........... 713/194; 455/410, 411, 41.2; 370/383
See application file for complete search history.

(56) References Cited

U.S. PATENT DOCUMENTS

| | | | | |
|---|---|---|---|---|
| 6,014,557 | A * | 1/2000 | Morton et al. | 455/410 |
| 6,748,540 | B1 * | 6/2004 | Canestaro et al. | 726/26 |
| 7,437,145 | B2 * | 10/2008 | Hamada | 455/410 |
| 2003/0050009 | A1 * | 3/2003 | Kurisko et al. | 455/41 |
| 2005/0021940 | A1 * | 1/2005 | Ma | 713/155 |
| 2005/0138425 | A1 | 6/2005 | Kim et al. | |
| 2006/0083187 | A1 * | 4/2006 | Dekel | 370/310 |
| 2006/0116107 | A1 * | 6/2006 | Hulvey | 455/411 |
| 2007/0041372 | A1 * | 2/2007 | Rao et al. | 370/356 |
| 2007/0101422 | A1 * | 5/2007 | Carpenter | 726/13 |
| 2007/0197163 | A1 * | 8/2007 | Robertson | 455/26.1 |

FOREIGN PATENT DOCUMENTS

WO    2005039138 A1    4/2005

* cited by examiner

*Primary Examiner* — Olumide T Ajibade Akonai
*Assistant Examiner* — Shantell L Heiber
(74) *Attorney, Agent, or Firm* — Locke Lord LLP

(57) ABSTRACT

A method, device and system restrict and prevent virus attack and malicious software to a wireless communication device from a pairing attempt by another wireless communications device. A switch is included in a transmission path coupling a first device to a second device, wherein the second device is attempting to pair with first wireless communications device. A detector coupled to the transmission path, detects an address of the second wireless communications device in a pairing communication protocol between the first and second devices. A counter coupled to the detector counts the pairing attempts of the second device. A compare circuit compares the pairing attempts to a selected number N. The compare circuit signals the switch to open when the number of attempts equals or exceeds the number N, breaking the connection, thereby preventing the first device from receiving virus attacks and malicious software.

33 Claims, 4 Drawing Sheets

RESTRICTING AND PREVENTING PAIRING ATTEMPTS FROM VIRUS ATTACK AND MALICIOUS SOFTWARE

BACKGROUND OF INVENTION

1. Field of Invention

This invention relates to wireless communication systems, methods, and devices. More particularly, the invention relates to wireless communication system, methods and devices restricting and preventing pairing attempts from virus attack and malicious software.

2. Description of Related Art

Mobile wireless communication including cellular, short range, local area networks and the like, especially Bluetooth connection setup are subject to virus attacks and malicious software during file transfer while in a paired state. The Bluetooth connection setup (as described in the *Bluetooth Specification*, Version 2, Vols. 1-4, dated Nov. 4, 2004, fully incorporated herein by reference) is frequently implemented in such a way that the user is asked whether to accept a connection or reject it. While this functionality is intended to prevent unknown and unauthorised devices from establishing a connection to the user's device, virulent software on an unknown device may continuously bombard the user device with connection attempts on the wireless air interface in order to spread out on as many devices as possible. The user, tired of rejecting the repeated connection attempts, might finally be tempted to accept it once in order to stop the repeated user queries on his own device. Thus, the virulent software might be "successfully" installed on the own device.

One problem with the current implementations seen on many wireless Bluetooth devices is that the user interface may be blocked by the connection attempts, leaving the user only the option to accept or reject the connection attempt, but preventing him from using any other function of the device. Especially, the user may not be able to enter the menu in order to switch Bluetooth off in order to stop the connection attempts. The only option left would be to leave the reception area of the device which initiated the connection attempts. However, this option may not always be possible, and the user would typically not know in which direction to go in order to avoid the unknown connection attempts.

Also, there is no way to perform anything with the mobile terminal before the file transfer is accepted. The user may not be able to get into menu before the file transfer and installation has been done or the attack has ended. The notification pop-up takes over the user interface (UI) and other functions that accept or reject can not be done. If Accept (Yes) is selected, the malicious virus software (SW) gets in, and if Reject (No) is selected, the same pop-up appears repetitively.

What is needed in the art is a modification of the connection set up process in wireless communications wherein a terminal has a mechanism to detect and reject a virus attack; identify the attacker and the address, create and store a rejected list of attackers denied entry, and establish a time period for denying connection attempts whereby a user does not need to turn off the system to avoid an attack, as is the case in the current state of the art.

Prior art related to mobile devices and virus attacks includes:

A. USPA 20050081051 discloses a method, system, and program for mitigating self-propagating e-mail viruses. A request to send an electronic mail message with a file attachment to intended recipients is received. A characteristic of the intended recipients is compared with a maximum recipient limit for the file attachment. If the characteristic of the intended recipients exceeds the maximum recipient limit for the file attachment, then a sender authorization is requested prior to sending the electronic mail message. The sender authorization is required such that if a virus is attempting to self-propagate by sending the electronic mail message, the attempt is mitigated.

The prior art fails to address the problem or provide a solution for preventing virus attack in file transfer between paired mobile devices without shutting down the devices, as is presently the state of the art.

SUMMARY OF INVENTION

In one embodiment, a wireless RF communication system includes at least a pair of terminal, typically mobile telephones linked to a base station serviced by a base station controller (BSC). The controller is coupled to the Internet serving various communication networks, including public switched telephone networks (PSTN), Intra nets and the like. One terminal is unknown to the other and is seeking to pair with the other terminal. In some instances the unknown terminal is seeking to transfer a virus, typically malicious software to the other terminal, using Bluetooth pairing protocols described in the Bluetooth Specification Version 2, EDR, Vol. 4, dated Nov. 4, 2004, page 189 and an implementation of the invention is to restrict the number of pairing attempts from the unknown terminal. For this purpose, the number of rejected pairing attempts is determined. Depending on the number how many times a user rejected pairing attempts from a certain device or from any device, the device would make a decision to reject the pairing attempt automatically and, preferably, without notifying the user. For example, if a user pressed 3 times a "pair control" function for incoming connection requests, the terminal would block further connection requests. The terminal address would be captured and stored in a rejected list of terminals to be rejected for pairing. Another implementation is to block connection requests only from the terminal that made the attempts. However, the Bluetooth device ID can easily be falsified in such malicious connection attempts, and the unknown terminal could thus change its identity with each new attempt. Alternatively, another implementation, after 3 rejections, a user terminal could block any connection attempt. If the user would then want to set up a wireless connection, the user could switch the Bluetooth connectivity on again in the Bluetooth menu. An additional menu entry would allow this functionality. Alternatively, a user definable timer could be used to define a time period for how long further connection attempts would be rejected. For example, after 3 rejections from the unknown terminal, no more connection attempts would be accepted by the receiving terminal. At the same time, a timer would be started and set for e.g. 15 minutes. After 15 minutes, further connection attempts would again be accepted and presented to the user by the "pair control" function. As a further alternative, Bluetooth could be switched off completely after 3 rejections by the receiving terminal.

An aspect of the invention is a wireless communication terminal, wherein the terminal accepts pairing with another terminal, provided the another terminal is not on a rejected list maintained by the terminal.

Another aspect is a wireless communication terminal including a pair control mechanism, which when repetitively actuated, e.g. three (3) by a user in response to a connection request, causes the terminal to proceed and block the connection request.

Another aspect is a wireless communication terminal wherein a pair control mechanism, after acceptance of a connection request for a pairing, denies the installation of software in the paired device after several installation attempts by the pairing device.

Another aspect is a wireless communication terminal including a timer mechanism which in combination with a pair control mechanism enables a user to define a time period for how long further connection attempts would be rejected.

Another aspect is a wireless communication terminal for restricting pairing attempts by an unknown terminal served by Bluetooth or IEEE 802.11 or local area networks, e.g. wireless local area network (WLAN).

Another aspect is a wireless communication terminal which blocks out pop notification on a terminal display after a connection request is blocked for a pairing request by an unknown terminal.

DESCRIPTION OF DRAWINGS

These and other aspects, features and embodiments of the invention will be described below in a description of a preferred embodiment, taken in conjunction with an appended drawings, in which.

DESCRIPTION OF EMBODIMENT

Figure 1:
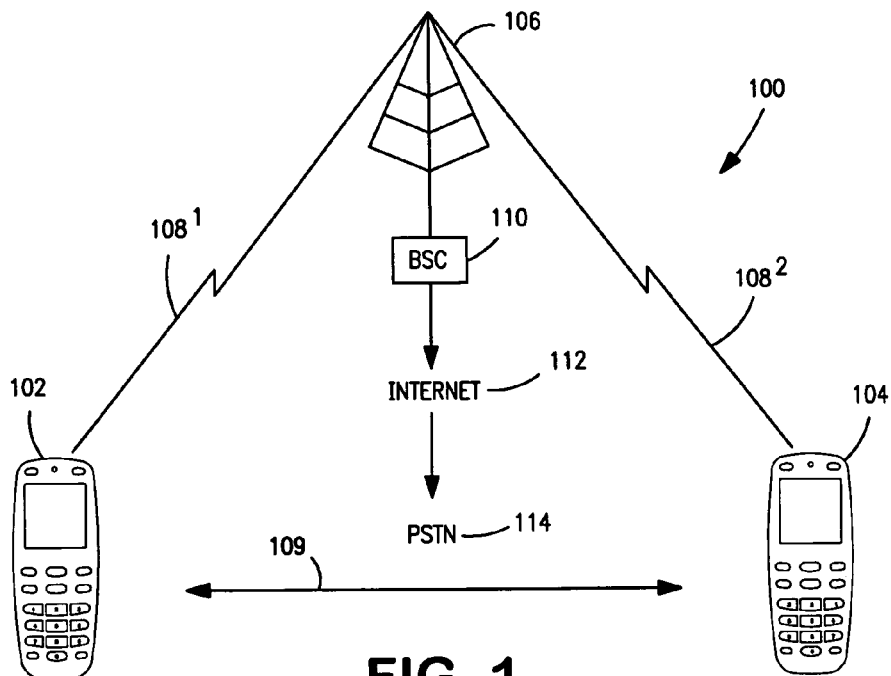
FIG. 1 is a representation of mobile terminals within a coverage area of base station for establishing a paired state between the terminal for the transfer of data there between where one terminal is unknown to the other terminal and incorporates the principles of the present invention.

FIG. 1 discloses a system 100 for pairing at least two terminals 102 and 104, typically standard mobile telephones and establishing a paired state for the terminals so that they can exchange data, speech, etc. on an as-needed basis. Pairing is described in the Bluetooth Specification, supra, Vol. 4, page 189, and Vol. 3, pages 251-252. Two procedures are defined. Either the user initiates the pairing or bonding procedure and enters a pass key with the explicit purpose of creating a secure relationship between the two Bluetooth devices, or the user is requested to enter a pass key during the established procedure, since the devices do not share a common link key beforehand. In the first case, the user is said to perform bonding by entering the passkey. In a second case, the user is said to authenticate using the passkey.

In one embodiment, the terminals 102 and 104 may be paired directly via a wireless connection 109. Alternatively, the terminals maybe linked to a base station 106 and paired via cellular connections (e.g. according to the GSM standard) $108^1$ and $108^2$. In turn, the base station 106 may be coupled to a base station controller 110 enabling the devices 102 and 104 to be paired with other communication devices outside the wireless networks 108 and 109 via a distributed information network 112, e.g. the Internet connected to a public switched telephone network (PSTN) 114, and other inter and intra networks, not shown.

Figure 2:
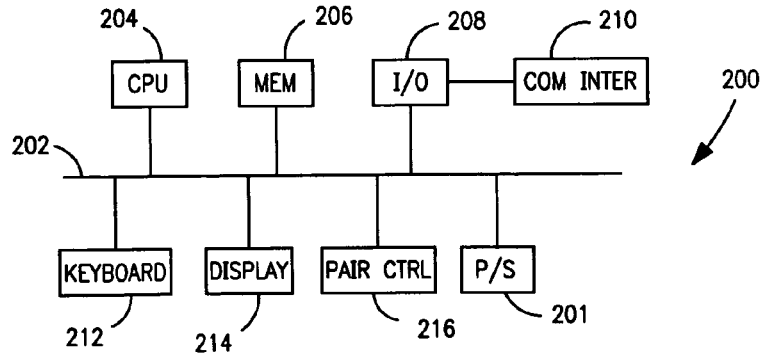
FIG. 2 is a representation of functional hardware units included in the terminals of FIG. 1.

FIG. 2 discloses functional units 200 installed in the terminals 102 and 104 for implementing a pairing process. A bus bar 202 powered from a power supply 201 serves the functional units. A central processing unit 204, typically a microprocessor, executes protocols for establishing communications between the terminals in implementing the pairing process. A memory 206 stores software and data used for the operation of the terminals in implementing the pairing process. An I/O circuit 208 receives input and provides output Radio Frequency (RF) signals via a communication interface 210 coupled to antenna, (not shown). The communication interface enables the terminals 102 and 104 to communicate using Bluetooth or IEEE 802.11 or other wireless communication protocols. A keyboard 212 includes standard mobile telephone keys including select, connect, disconnect, scroll, etc. keys. Selected keys can be used for multiple purposes, particularly when actuated a number of times. In the present instance, the select key can be uses as an "accept key" in the pairing process. The disconnect key can be used as a "reject key" for a pairing process, when the disconnect key is actuated a selected number of times. Alternatively, soft keys whose function is shown in the display 214 can be used to accept or reject a pairing process. A display 214 provides a visual presentation of information generated by the processor or user or related to accessing available menus or options including implementing the pairing process by keyboard selection. A pairing control controller 216 is actuated automatically or by a user to reject a pairing connection as a precaution against a possible transfer of a virus or malicious software when an unknown terminal makes repeated attempts to access the terminal. The pairing controller 216 is shown in FIG. 5A, which will be described hereinafter.

Figure 3:
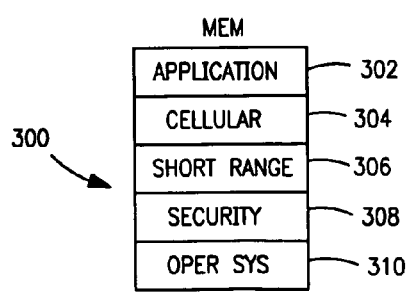
FIG. 3 is a representation of software installed in the terminals of FIG. 1 for implementing the aspects of the invention.

FIG. 3 discloses software 300 installed in the memory 206 for operating the terminals and implementing the pairing process. The software includes various application programs 302 for carrying out useful tasks, such as word processing, spreadsheets, database management, etc., and processes connected with the pairing process. An optional cellular communication protocol 304 enables the terminals to communicate over a cellular communication system, e.g. global system mobile (GSM), general packet radio service (GPRS), etc. A short-range communication protocol 306 typically Bluetooth or IEEE 802.11, enables the terminals to communicate directly with each other at close distances, e.g. 3 to 100 meters and setup or participate in Ad Hoc short range networks. Security programs 308 include generating: (i) passkeys for use in implementing the pairing process; (ii) a list of devices by origin or address rejected for pairing; (iii) a list of devices by origin or address previously attempting to connect to the user device with a count of the number of times attempted, and signalling functional units to perform or provide services, and (iv) a list identifying approved pairing device enables the user to select a device for pairing. An operating system 310 manages the processor 204 in executing the pairing and other functions of the user device.

Figure 4:
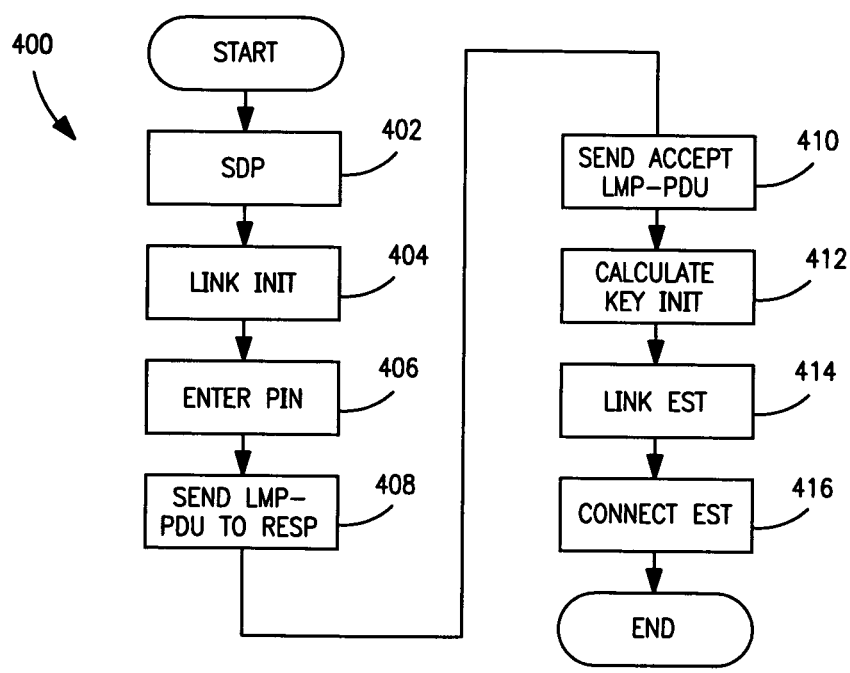
FIG. 4 is a flow diagram for establishing a paired state in the terminals of FIG. 1.

FIG. 4 describes a standard pairing process 400 for establishing a paired connection between the pairing devices 102 and 104 of FIG. 1. In a pairing procedure, after inquiry and paging, a service discovery protocol (SDP) is started in a step 402 to find the other one of the device pair. A link establishment procedure 310 is performed in a step 404 to establish a physical link between the devices. Both pairing devices involved in the wireless link enter the same Personal Identification Number (PIN) in a step 406. When the two pairing devices do not have a common link key, a Link Manager (LM) initiator in a step 408 sends a Link Manager Protocol (LMP) and a Protocol Data Unit (PDU) to the other or responder device. The responder device in a step 410 replies with an LMP accepted PDU. Both devices calculate an initialisation key ($K_{init}$) in step 412 based on a PIN; a random number, and a Bluetooth address (BD_ADDDR). When both devices have calculated $K_{init}$, a link key is created. However, if the responder rejects pairing, a LMP not accepted PDU is sent to the initiator with an error code "pairing not allowed". Using the created link key, a link establishment procedure is performed in step 414. A connection establishment procedure is performed in step 416 to establish a channel or logical link between the devices. Thereafter in a step 418, a connection establishment procedure is performed to establish a connection between the devices. Between a connection request from one of the devices and a connection acknowledgement of the other device, an authentication procedure may be performed, and the pairing process ends in a step 420. Once the users have generated their correct PIN code, both devices can generate a link key which can be stored in the device memory allowing the device to skip authorisation and the authorisation process every time a device attempts to communicate with the other paired device.

Figure 5:
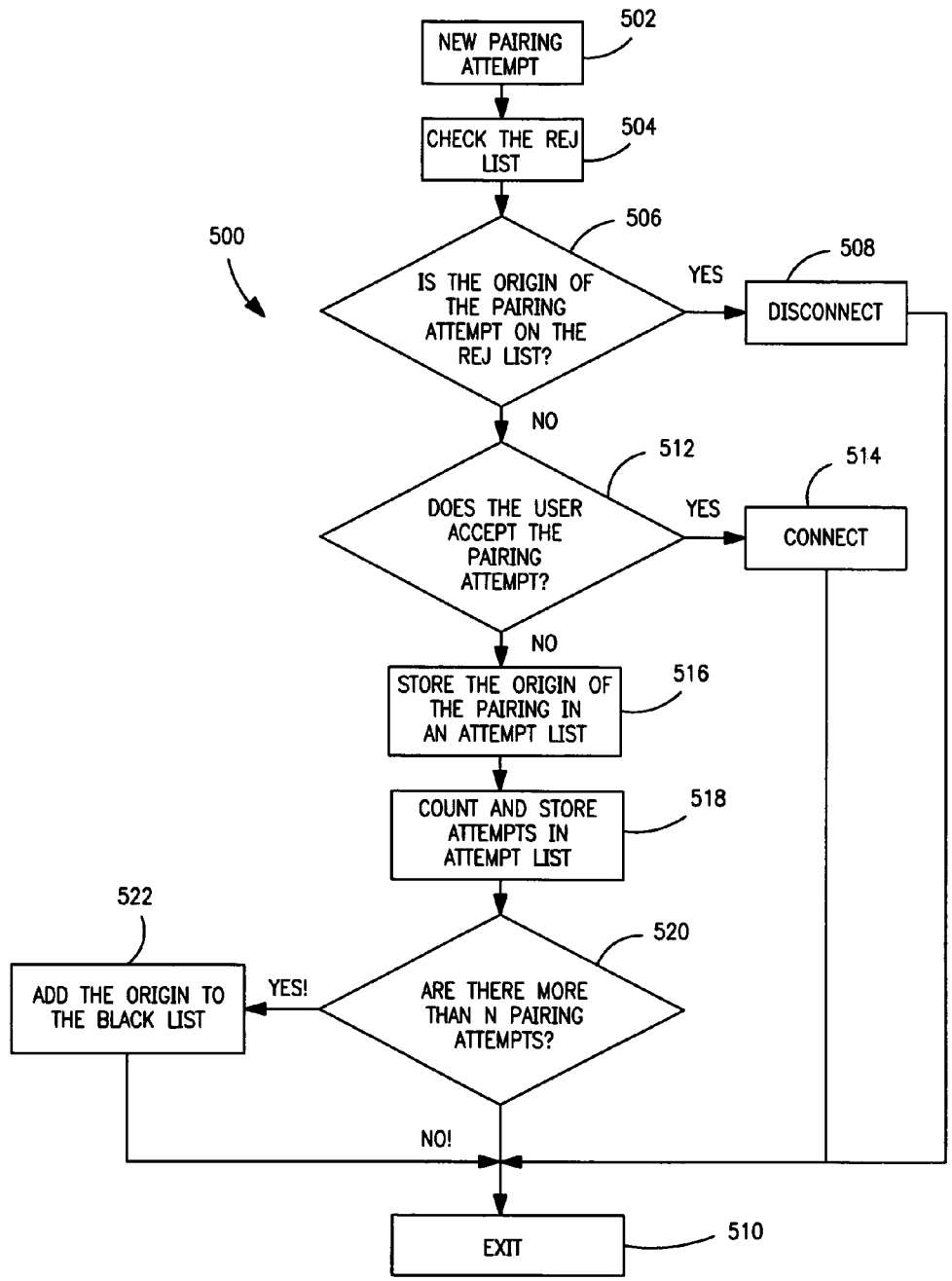
FIG. 5 is a flow diagram for a terminal blocking a connection request of an unknown terminal attempting to establish a paired state with terminal after several attempts in accordance with the principles of FIG. 1.
Figure 5A:
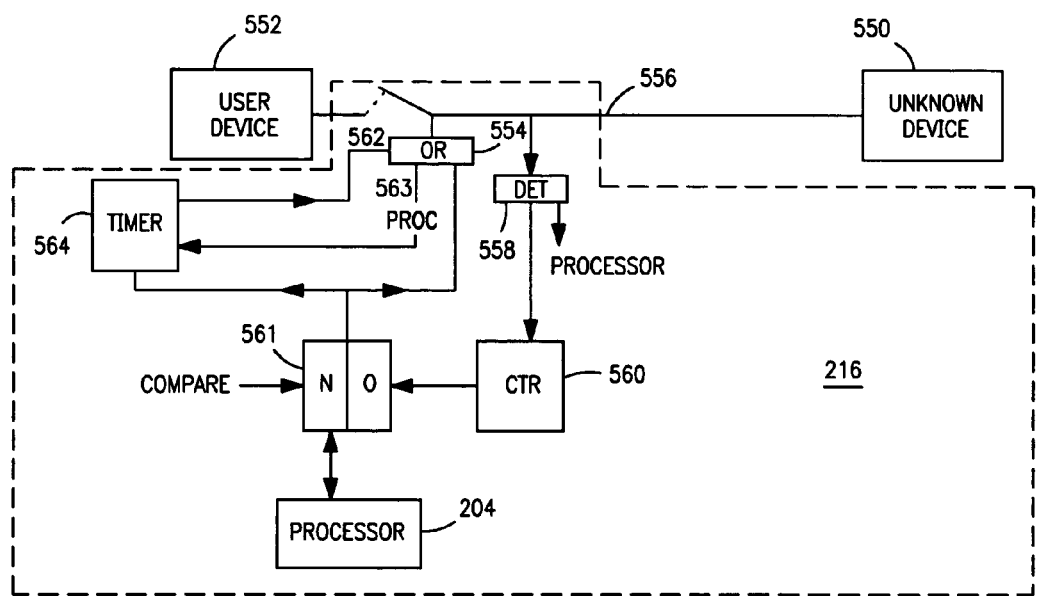
FIG. 5A is a representation of a reset and timer mechanism in the terminal of FIG. 1 for blocking connection requests of an unknown terminal device attempting to establish a paired state with the terminal

FIG. 5 describes a process 500 for a wireless device to restrict the number of pairing attempts from an unknown wireless device and avoid the possible transfer of a virus or malicious software or both from the unknown device. In step 502, an unknown wireless device attempts to initiate a pairing process with a user wireless device via Bluetooth or IEEE 801.11 or like communication protocols. In step 504, the user device responds to the inquiring device by accessing a local or remote memory for display of a rejected list of devices, terminals or the like, previously considered by the user wireless device or other wireless devices and rejected for pairing because of security or other reasons. A decision 506 is made to determine whether the origin of the pairing attempt is on the rejected list. A "yes" condition initiates a step 508 to disconnect the terminal from the unknown terminal of the process, and exit the process in step 510. A "no" condition for the decision 506 initiates a decision 512 to determine whether or not to accept the pairing attempt. In step 514, a "yes" condition authorises a connection with the unknown device based on the absence of the pairing device on the rejected list and the number of pairing attempt being less than a selected number. A "no" condition in step 516 stores the pairing attempts in an attempt list in a local or remote memory, the list indicating the origin of the attempted but not connected pairing requests. The number of pairing attempts is determined individually for each unknown device. Alternatively, the number of pairing attempts is determined cumulatively for all unknown devices. The number of attempted pairings but not connected for the unknown device is counted in a step 518. In one embodiment, the number of pairing attempts is counted by counting only rejected pairing attempts occurring in sequence. In another embodiment, the number of pairing attempts is counted by counting rejected pairing attempts occurring during a certain time period. In still another embodiment, a decision 520 is performed to determine whether the attempted but not connected list contains pairing attempts exceeding a selected threshold "N" for any listed device. A "no" condition ends the process in the step 511. A "yes" conditions adds the listed device to the rejected list in a step 522, after which the process ends in the step 510.

FIG. 5A discloses the pairing controller 216 of FIG. 2 for restricting the pairing attempts of an unknown wireless device 550 in connecting to a user wireless device 552. The pairing controller includes a switching device 554 responsive to multiple inputs via an OR gate, and is normally closed. The switch is coupled to a transmission path 556 coupling the user wireless device 552 with the unknown wireless device 550 attempting to pair with the user's device via standard pairing processes of Bluetooth or IEEE 801.11 or other like wireless networks. The identity of the unknown or pairing device is detected by a detector 558 via the BT address included in the connect signal by the unknown device to the user device in attempting to establish a connection with the user device for the exchange of information. The detector 558 is connected to a counter 560 and provides the detect signal to the counter and to the processor 204 (FIG. 2). The processor is programmed to update the rejected list 504 (FIG. 5) or the attempt connect list 516 (FIG. 5) from the signal provided by the detect circuit. The counter 560 is responsive to the detect signals and counts the connect attempt signals sent by the unknown device to the user device 550. The counter provides an output to a standard compare circuit 561. Stored within the compare circuit is an attempt number N selected by the user and provided by the processor from the memory 206 (FIG. 2). The processor also updates the compare circuit with the number of previous attempts of the unknown device from the updated rejected list 504 (FIG. 5) or the attempt connect list 516 (FIG. 5) based on the origin or the BT address for the attempt connect signal provided by the detect circuit. When the count input to the compare circuit causes the count to exceed the number N for the identified or unknown device 550, the compare circuit provides a signal 562 to a latch (not shown) in the switch 554, causing the switch to latch open and break the transmission path coupling the devices 550 and 552, avoiding the possible transfer of a virus or malicious software to the user device. Alternatively, the number of pairing attempts counted for the second or pairing device and provided to the compare circuit may be those rejected pairing attempts occurring in sequence. Or, the number of pairing attempts counted and provided to the compare circuit may be those rejected pairing attempts occurring during a certain time period.

Also, the switch 554 may be opened via a connection 563 activated by a user actuating a "reject key" on the keyboard 212 (FIG. 2) multiple times, typically three times. The key actuation causes the processor 204 to access the security software 308 (FIG. 3) in the memory to transmit a signal to the latch (not shown) in the switch to latch open the transmission path 556. Both the signal transmitted to the switch by the compare circuit and the reject key are provided to the processor, which accesses the security software in the memory 206 (FIG. 2) to block out pop up notification to the user regarding pairing attempts.

The compare signal 562 and the reject signal 563 to the switch may also be provided to a timer 564, which after a selected time interval, provides a signal 565 to reset the latch and close the switch 554, enabling the coupling of the user device to other known and unknown devices seeking to pair with the user device.

It will be apparent to persons skilled in the relevant art that various changes in form and detail can be made therein without departing from the spirit and scope of the invention. Accordingly, the breadth and scope of the present invention should not be limited by any of the above-described exemplary embodiments, but should be defined only in accordance with the following claims and their equivalents.

We claim:
1. A method, comprising:
    receiving at a user's wireless communication device via a pairing controller at least one pairing attempt from at least one unknown wireless communications device using a communication protocol for pairing in a trusted connection;

displaying a notification on a display at the user's wireless communication device, associated with the at least one pairing attempt;

receiving a reject signal at the user's wireless communication device, from the user of the wireless communication device via a user interface at the user's wireless communication device, activated by the user of the wireless communication device in rejecting the at least one pairing attempt;

counting at the user's wireless communication device a number of times that the user of the wireless communication device has rejected pairing attempts from each of at least one unknown wireless communication device according to the pairing controller at the user's wireless communication device, the count indicating a paring attempt number determined by the pairing controller; and deciding at the user's wireless communication device to reject the pairing attempt by the at least one unknown communications device depending on whether the rejected pairing attempt number determined by the pairing controller is greater than a threshold count value.

2. The method of claim 1, wherein earlier pairing attempts are stored in a list in order to determine the pairing attempts by the at least one unknown wireless communication device rejected by the user.

3. The method of claim 1, wherein the pairing attempt number by the at least one unknown wireless communication device rejected by the user is determined by counting only pairing attempts rejected in a sequence.

4. The method of claim 1, wherein the pairing attempt number is determined by counting only pairing attempts rejected during a certain period of time.

5. The method of claim 1 wherein the determination to reject the pairing attempt is made when the pairing attempt number exceeds a threshold.

6. The method of claim 1 wherein the pairing attempt number is determined individually for each of the at least one unknown wireless communication devices.

7. The method of claim 1 wherein the pairing attempt number is determined cumulatively for all of the at least one unknown wireless communication devices.

8. The method of claim 1 further comprising:
detecting an address of the at least one unknown wireless communications device from the communication protocol;
generating a first or rejected list containing the addresses of the at least one unknown wireless communication devices rejected for pairing in a trusted connection by the user's wireless communication device; and
generating a second or attempted list containing the addresses of the at least one unknown wireless communications devices, not included in the first list, and including the number of pairings attempted by the at least one unknown wireless communications device with the user's wireless communications device.

9. The method of claim 8 further comprising:
determining if the at least one unknown wireless communications device is listed in the rejected list and terminating the pairing attempt if the at least one unknown wireless communication device is so listed in the first or rejected list;
determining if the at least one unknown wireless communications device is listed in the second or attempt list, and if so, update a count of the pairing attempts, and if not, add the at least one unknown wireless communications device to the second or attempt list including a count indication for the pairing attempt; and
determining if the count of the pairing attempts is more than a preselected number of pairing attempts.

10. The method of claim 9 further comprising:
terminating the pairing attempt for the at least one unknown wireless communication device if the number of pairing attempts by the at least one unknown wireless communication device equals or exceeds the preselected number.

11. The method of claim 9 further comprising:
adding the at least one unknown wireless communication device to the rejected list if the number of pairing attempts by the at least one unknown wireless communication device equals or exceeds the preselected number.

12. The method of claim 9 further comprising:
counting the pairing attempts of the at least one unknown wireless communications device and updating the count in the attempt list at the address listed in the attempt list for the at least one unknown wireless communications device.

13. The method of claim 12 further comprising;
comparing the count of the at least one unknown wireless communications device in the attempt list to the preselected number, and if less than the preselected number accepting the pairing of the user's and at least one unknown wireless communication devices.

14. The method of claim 9 further comprising:
updating a compare circuit in the user's wireless communications device for the determination of pairing or termination of pairing from the data stored in the attempt list and the preselected number stored in a memory included in the user's wireless communications device.

15. The method of claim 9 further comprising:
storing an address for each pairing attempt in the attempt list and updating a count of the pairing attempts by the respective at least one unknown wireless communication devices included in the attempt list.

16. The method of claim 1 further comprising:
initiating a timer after terminating a pairing attempt to place the user's wireless communication device in condition for receiving another pairing attempt by an unknown wireless communication device after a selected time interval.

17. The method of claim 1 further comprising:
terminating a pairing attempt by an unknown wireless communication device by operating a reject key included in the user's wireless communication device.

18. The method of claim 1 further comprising:
blocking a pop up notification from appearing in a display included in the user's wireless communication device when a pairing attempt is terminated.

19. A wireless communication device, comprising:
a processor, the processor including at least a memory, a display, a user interface, a pairing controller and software configured to:
display a notification on the display of the wireless communication device, associated with at least one pairing attempt;
receive a reject signal from the user of the wireless communication device via the user interface of the wireless communication device, activated by a user of the wireless communication device in rejecting the at least one pairing attempt;

count at the wireless communication device a number of times that the user of the wireless communication device has rejected pairing attempts from a trusted connection with each of at least one unknown wireless communication device according to the pairing controller at the wireless communication device, the count indicating a paring attempt number determined by the pairing controller; and decide at the wireless communication device to reject the pairing attempt by the at least one unknown communications device depending on whether the rejected pairing attempt number determined by the pairing controller is greater than a threshold count value.

20. The wireless communication device of claim 19 wherein the processor is further configured to:

generate and store in the memory a rejected list as a first list containing the addresses of the at least one unknown wireless communication devices rejected for pairing by the wireless communication device;

generate and store in the memory a second or attempted list containing the addresses of the at least one unknown wireless communications devices, not included in the first list, and include a count of the number of pairings attempted by the at least one unknown wireless communications device with the device; and determine if the at least one unknown wireless communications device is listed in the rejected list and terminate the pairing attempt if the at least one unknown wireless communication device is so listed in the first or rejected list.

21. The wireless communication device of claim 20, wherein the processor is further configured to:

determine if the at least one unknown wireless communications device is listed in a second or attempt list, and if so, update a count of the pairing attempts, and if not, add the at least one unknown wireless communications device to the second or attempt list including a count indication for the pairing attempt; and determine if the count of the pairing attempts exceeds more than a preselected number.

22. The wireless communication device of claim 21, wherein the processor is further configured to:

add the at least one unknown wireless communication device to the rejected list if the number of pairing attempts by the at least one unknown wireless communication device equals or exceeds the preselected number.

23. The wireless communication device of claim 19, wherein the processor is further configured to:

activate a timer after a pairing attempt by a second wireless communications device is terminated to place the wireless communication device in condition for receiving another pairing attempt by an unknown wireless communication device after a selected time interval.

24. The wireless communication device of claim 19 further comprising:

a reject key when operated terminating a pairing attempt by an unknown wireless communication device.

25. The wireless communication device of claim 19, wherein the processor is further configured to:

count the pairing attempts of the at least one unknown wireless communications device and update the count in the attempt list at the address listed in the attempt list for the at least one unknown wireless communications device.

26. The wireless communication device of claim 19 further comprising:

a compare circuit configured to compare the count of the at least one unknown wireless communications device in the attempt list to the preselected number, and if less than the preselected number complete the pairing of the device and at least one unknown wireless communication devices.

27. The wireless communication device of claim 26 wherein the compare circuit is configured to determine pairing or termination of pairing from the data stored in the attempt list and store the preselected number in a memory.

28. The wireless communication device of claim 19 wherein the processor is configured to further block a pop up notification from appearing in a display when a pairing attempt is terminated.

29. The wireless communication device of claim 19 wherein the memory is configured to store an address for each pairing attempt in the attempt list and update a count of the pairing attempt by the respective at least one unknown wireless communication devices included in the attempt list.

30. A system, comprising:

a user's wireless communications device and a second wireless communications device coupled together via a transmission path, the second wireless communications device attempting to pair in a trusted connection with the user's wireless communications device, wherein the second wireless communications device is unknown to the user's wireless communications device;

a display in the user's wireless communication device, configured to display a notification associated with the pairing attempt;

a user interface in the user's wireless communication device, configured to be activated by a user of the wireless communication device in rejecting the pairing attempt;

a pairing controller in the user's wireless communication device, including a switching device in the transmission path;

a detector in the user's wireless communication device, coupled to the transmission path and configured to detect an address of the second wireless communications device in a pairing communication protocol between the second and user's wireless communications devices;

a counter at the user's wireless communication device, coupled to the detector and configured to count a number of times that a user of the user's wireless communication device has rejected pairing attempts from the second wireless communications at the address identified by the detector;

a list in the user's wireless communication device, of devices by origin or address rejected for pairing by the user of the user's wireless communication device;

a compare circuit at the user's wireless communication device, coupled to the counter, the compare circuit configured to compare attempts counted by the counter for the second wireless communications device at the identified address to a selected preselected number, the compare circuit further configured to signal the switching device to open, to break the coupling between the user's and second wireless communications device when the attempts equal or exceed the preselected number for the device on the list rejected for pairing, thereby preventing the user's wireless communications device from receiving virus attacks and malicious software.

31. The system of claim 30 further comprising:

a processor responsive to the compare circuit signal to block a pop up notification from appearing in a display included in the user's wireless communication device when a pairing attempt is terminated.

32. The system of claim 30 further comprising:

a timer coupled to the switching device and activated after termination of a pairing attempt and a selected time interval to close the switching device, and place the user's wireless communication device in condition for receiving another pairing attempt by an at least one unknown wireless communication device.

33. An apparatus, comprising:

means for receiving at a user's wireless communication device via a pairing controller at least one pairing attempt from at least one unknown wireless communications device using a communication protocol for pairing in a trusted connection;

means for displaying a notification on a display at the user's wireless communication device, associated with the at least one pairing attempt;

means for receiving a reject signal at the user's wireless communication device, from the user of the wireless communication device via a user interface at the user's wireless communication device, activated by the user of the wireless communication device in rejecting the at least one pairing attempt;

means for counting at the user's wireless communication device a number of times that the user of the wireless communication device has rejected pairing attempts from each of at least one unknown wireless communication device according to the pairing controller at the user's wireless communication device, the count indicating a paring attempt number determined by the pairing controller; and means for deciding at the user's wireless communication device to reject the pairing attempt by the at least one unknown communications device depending on whether the rejected pairing attempt number determined by the pairing controller is greater than a threshold count value.

\* \* \* \* \*